United States Patent Office 2,950,974
Patented Aug. 30, 1960

2,950,974

CONVERSION OF FLAVONOID GLYCOSIDES

Carl V. Smythe, Moorestown, N.J., and Dudley W. Thomas, Morrisville, Pa., assignors to Rohm & Haas Company, Philadelphia, Pa., a corporation of Delaware No Drawing. Filed May 26, 1958, Ser. No. 737,477

16 Claims. (Cl. 99—106)

This invention concerns an enzymic conversion of naringin. In a particular aspect, this invention concerns an enzymic method for improving the flavor of naringin-containing aqueous solutions by decreasing their naringin content. More specifically, this invention relates to a method for decreasing the naringin content of aqueous solutions, especially juices, by treating them under specified conditions and for a specified time with an enzyme preparation containing naringinase to split naringin. Another aspect of this invention relates to an enzymic method for preparing the flavonoid glucoside, prunin.

Naringin is a compound which is responsible for the characteristic bitter flavor in aqueous solutions, including juices. Naringin is a rhamnosido-glucosido-hydroxy flavanone. The portion of the molecule free of rhamnose, i.e., the glucoside of the hydroxylated flavonoid, is named prunin. The portion of the naringin molecule free of both rhamnose and glucose portions, i.e., the aglycone, is named naringenin. Prunin and naringenin, the latter to a limited extent, are products formed in our method.

Naringinase in this invention is defined, as further explained herein, as an enzymic principle which is capable of yielding rhamnose with or without glucose from naringin. In accordance with our invention, enzymic treatment is carried out until at least 15% of the original naringin is split to the product prunin but before complete conversion of prunin to naringenin, a second product. Conversion of prunin to naringenin is arrested when there remains, generally all in solution, an amount of prunin which is equivalent to at least 15% of original naringin in the treated juice. This invention also relates to improved juice products of acceptable flavors, free of objectionable bitter taste and further characterized by having a decreased naringin content, a relatively high prunin content and a limited amount of naringenin.

Naringin is found in juices of certain agricultural products; it is found in the juices of fruit of the citrus species. It is found in tangerine juice and it is quite common in grapefruit juice. Naringin occurs in highest concentration in the albedo layer, in seeds, in the core, and in membranes of vegetables or fruit. Its taste remains distinctly detectable in fresh, refrigerated, pasteurized, canned, and in frozen juices. The taste of naringin is also detectable in fruit sections, especially grapefruit sections, the juice of which contains this bitter principle. Its concentration in the fruit is highest at the early part of the harvest season; as a result juices extracted from fruit harvested early are particularly bitter. As a consequence, the bitter taste of naringin in juices is a problem for the fruit and vegetable processing industry, which has precluded fully commercially exploiting various applications of such fruit juices containing naringin. Hence, it has been a pressing concern for processors of naringin-containing juices to find methods for improving the taste of such juices by reducing their naringin content. A modern suggestion is to treat aqueous solutions containing naringin with activated carbon, to adsorb it thereon and subsequently to filter out the carbon. This physico-chemical method requires heating the juice and it often causes undesirable adsorption of natural pigments, pectin bodies, and flavors concurrently with naringin removal. One method to decrease the naringin content of juices which we have considered is to convert naringin directly to naringenin without intermediate formation of prunin. As of now, such a system does not appear to have the advantages and value of our present invention. In another attempt to improve the flavor of bitter juices, it has been proposed to use an enzymic principle capable of degrading naringin in steps all the way to its primary component, the hydroxylated flavonoid, naringenin. It was expected that the more complete the degradation of naringin to naringenin the greater the flavor improvement of the juice. However, such a method was found to be of little practical interest, particularly in view of its tendency to develop off-flavors and to detrimentally affect the natural pectinic cloud of the juice. Moreover, contrary to expectations, we found not only that complete degradation of naringin to naringenin was unadvisable, but moreover that by limiting the conversion to naringenin to the extent prescribed in our invention new and valuable results are obtained. Whereas a degradative hydrolysis of naringin to naringenin appears to be considerably inhibited by natural substances present in the juice, surprisingly such substances have no significant inhibitory effect on our conversion of naringin to prunin and limited conversion to naringenin. Another valuable aspect of our invention is that, unlike prior suggested solutions of this problem, we preserve the natural valuable flavor bodies and the desired pectinic cloud which may be present in fruit juices containing naringin. Yet, another surprising aspect of our invention is that, unlike a degradative hydrolysis of naringin in which the content of products of decreasing solubility tend to increase and to crystallize, we encounter no such crystallization problem. On the contrary, the products of our process contribute to the natural flavor and body of the treated juice. Other advantages of our process will become apparent further below.

Our invention is applicable to any aqueous solution containing naringin and it comprises treating aqueous solutions, containing naringin, such as fruit juices, by mixing therewith an enzyme preparation containing naringinase. The naringinase causes conversion of naringin to prunin and only partially to naringenin. The ezymic treatment is arrested when the product is prunin in an amount which is equivalent to at least 15%, and preferably 40 to 85% of starting naringin in the juice.

In accordance with our invention, the origin of the naringin-containing juice is not critical. It may be obtained from agricultural products or it may be prepared from isolated or synthetic materials. At the present time, the more valuable practical applications are concerned with treating extracts, concentrates and juices from agricultural products, such as vegetable or fruit juices containing naringin as at least one of its bitter elements. This invention is also applicable in the preparation of citrus fruit, such as grapefruit vinegar and wines. In the present application and in the claims, the term "juice" is generic to and refers to any liquid in any concentration obtained from vegetables, fruit, or any component part thereof, such as peels and/or seeds, containing naringin. The juice may result from pressing such a naringin-containing product; in that case the juice is referred to as single strength. Herein, the term "juice" also refers to a juice of more than one vegetable or fruit, or to mixtures of fruit or vegetable juices or mixtures of one or more fruit juices with one or more vegetable juices. The component juices of any single mixture need not all contain naringin. The juice that is treated may be a single strength juice, any dilution thereof, or, as may be quite common, the juice may be a concentrate. The juice may be fresh, sterilized or processed. There may also be treated segmented or whole peeled fruit, such as grapefruit segments.

The juice that is treated may have minute amounts of naringin, as little as 0.001% of naringin. Bitter juices and concentrates thereof may contain amounts ranging to about 6% of naringin. Free run juices generally contain from about 0.03 to 0.1% and more commonly 0.03 to 0.08% of naringin. When the concentrations of naringin tend to be in the upper range as from about 1% to 6% or even higher under some circumstances when the solution is supersaturated, some of the naringin tends to crystallize. However, even under such circumstances, in accordance with our process, naringin concentration is effectively reduced while supersaturation decreases gradually and more naringin goes into solution; ultimately the desired reduction in naringin content is achieved. This type of situation may occur in the preparation of citrus molasses where, accordingly, our invention has a particular practical value.

The amount of enzyme preparation containing naringinase employed for treatment is that amount which is effective in decreasing the naringin content to the desired concentration. As little as 0.001% of naringinase enzyme preparation may affect the naringin content; generally a range of 0.01 to 0.5%, and preferably a range of 0.01 to 0.05% of enzymic preparation is employed. Greater amounts than about 1% appear unnecessary. The amount of naringinase-containing enzyme preparation may be adjusted in accordance with the temperature at which the treatment is carried out; the higher temperatures generally being more conducive to rapid conversion of naringin. The enzyme preparation containing naringinase may be added in a powder or liquid form. Liquid preparations may be prepared from powders in advance of treatment. When adding the enzyme preparation containing naringinase to the juice, it is preferable to mix the juice and enzyme at least for part of the time in order to promote the fullest reaction and solubilization should any be necessary. Admixing of enzyme may be incremental or performed initially all at once.

We have found that naringinase activity occurs in the pH range from about 9 to as low as 2.5. Naringinase-containing enzyme preparations are highly effective within a pH range of 5.0 to 3.0 which is the natural pH of most juices. Enzymic activity in the acid range is particularly advantageous since low acid pH values are more likely to occur in early-season fruit in which the concentration of naringin tends to be on the high side. In fact, treatment of early-season fruit, that is fruit in which the Brix acid ratio is low, highlights the value of our invention since it is at that time that the concentrations of naringin tend to be high and the sweet masking taste of sucrose tends to be at a minimum. In the instant invention and in the claims, early-season juice which is derived from early-season fruit is defined as juice in which the Brix acid ratio generally ranges from about 6:1 to 12:1 and generally in the range of 6.5:1 to 8.5:1. Brix is defined as total soluble solids, usually most of it sugar; acid is calculated as anhydrous citric acid per 100 ml. of juice. Brix acid ratio varies according to the region where the fruit is grown. For instance, early-season Texas grapefruit approaches an 8.0:1 ratio while Florida fruit often approaches 6.5:1.

The temperature at which the instant treatment may be carried out is preferably kept for a major part of the time from about 5° to about 60° C. For rapid conversion, a temperature in the range of 25° to 50° C. is desirable but naringinase is also active at temperatures in the range of about 25° to 5° C. Naringinase activity in this lower temperature range is a useful aspect of our invention in permitting treatment of naringin-containing juices while stored under refrigeration. We have found that a particularly efficacious combination of pH and temperature ranges from numerous industrial applications is a pH range of about 3.0 to 4.5 at a temperature range of 25° to 35° C. This combination of conditions tends to promote rapid improvements in the treated naringin juice.

In accordance with our method, the enzyme preparations containing naringinase cause a splitting of naringin to prunin and of the prunin to a limited extent to naringenin. Splitting of naringin to prunin reaches at least 15% of initial naringin concentration, preferably it reaches a range from about 40% to 60%. It may reach essentially 100% conversion. Under all circumstances, conversion to naringenin is controlled in order to preserve an amount of prunin equivalent to at least 15%, and preferably at least 50%, of the origin naringin in the juice. Under some special aspects of our invention, conversion of naringin is limited to the formation of prunin; essentially no conversion to naringenin being allowed to occur and the amount of prunin being essentially equivalent to the decrease of original naringin content of the juice.

The two steps in the conversion of naringin to naringenin may occur simultaneously for at least a major part of the time. However, it is possible to have conversion to prunin substantially completed before significant conversion to naringenin occurs.

The process of our invention is carried out with enzyme preparations containing naringinase which may be obtained from various sources. The preparations may be extracted from plant tissues, such as from the leaves, albedo, and flavedo of the citrus fruit, of celery, and of rhubarb. The required naringinase-containing preparation may also be obtained from bacteria and fungi. Enzymes suitable for use in our invention are elaborated, for example, by various fungi. Particularly rich fungal sources are aspergilli, such as *A. niger, A. alliaceus, A. wentii*, and others. Likewise, other fungi, such as certain penicillia species may be induced to produce the required naringinase under proper combination of conditions. We prefer to grow the naringinase-producing strains on a culture medium favoring development of the desired activity in high degree. Tray culturing methods or submerged propagation of the desired strain may be carried out to produce the necessary enzymic principle. The ingredients and proportions thereof essential to promote growth of the selected organism are known to those skilled in the art. But, we have found that in order to promote naringinase production, there may be added to the growing medium some form of a pulp of an agricultural product, such as beet pulp, citrus fruit pulp, orange and lemon pulp, grape residues, or apple pomace are useful. Steffen's waste and/or pectinous materials in limited amount have also been found advantageous.

In conjunction with the prescribed ingredients for the medium, there should also be used a source of nitrogen. The source may be in the form of simple nitrogenous compounds, such as nitrates or ammonium salts, or in the form of more complex nitrogen compounds, such as amino acids, peptides, or proteins. The growth medium is sterilized and then inoculated with the appropriate organism. Growth is carried out at a pH generally below 7 for the major part of the time and commonly between about 3 and 7. Aeration and/or shaking may be provided to further promote the growth of the desired organism. Optimum temperature for developing the desired enzyme system ranges from about 20° to 35° C. A suitable amount of growth is generally obtained in about 72 to 116 hours. At the end of that time, the crude broth is harvested. Concentration of the enzyme may be accomplished by the use of adsorption materials or by precipitation and isolation of the desired active principles. Precipitation of enzymes may be effected by the addition of salts and/or an organic solvent which are miscible with water, such as methyl ethyl, or propyl alcohols, acetone, or dioxane. The precipitate is collected and dried at a relatively low temperature, as in the range of 10° to 35° C., and in this manner there is obtained a crude extract containing the desired enzymic principles. If it is desired to separate from the naringinase-containing enzyme preparation enzyme systems acting on pectin, the naringinase-containing enzyme preparation may be treated with thiourea or urea.

A screening test for demonstrating the presence of the desired type of catalytic system in crude enzyme preparations is one that uses p-nitrophenyl-β-d-glucoside as substrate. This is a colorimetric test whereby there is determined the amount of p-nitrophenol enzymically liberated by potential naringinase-containing preparations under defined conditions of temperature, pH, and time. At the end of the test, the substrate is made strongly alkaline, thereby developing a yellow color, the intensity of which depends on the amount of p-nitrophenol enzymically liberated. From a calibrated curve for different concentrations of p-nitrophenol there may be determined the final p-nitrophenol concentration and, hence, the enzyme activity. A standard enzyme preparation is one which yields at least $0.5 \times 10^{-3}$ moles p-nitrophenol from a $1.69 \times 10^{-3}$ molar solution in 20' at a temperature of 28° C. and a pH of 5.

The presence of the desired naringinase-enzymic principle in enzyme extracts may be further characterized by its capacity to yield rhamnose with or without glucose from a solution of naringin. Conveniently enzymic extracts may be tested on the following substrate solution:

|  | Grams |
|---|---|
| Naringin, recrystallized (technical grade) | 0.5 |
| Citric acid | 15 |

NaOH to adjust pH to 4.0.
Water to make 1000 ml.

From this naringin solution, there are taken 25 ml. which are mixed with 0.2 ml. of enzyme extract solution to be tested. The mixture is incubated at 50° for two hours. The treated solution is then heated at 100° C. for 15 minutes. The cooled substrate is tested for the presence of rhamnose or glucose. Standard methods for identifying sugars, such as the Somogyi method, are suitable. As a convenient paper chromatographic procedure, there may be used the following solvent:

|  | Parts |
|---|---|
| n-Butanol | 4 |
| Acetic acid | 1 |
| Water | 5 |

Chromatographic filter paper spotted with known volumes of treated substrate are irrigated with this solvent. After irrigation with solvent at 30° C., the filter paper is removed, dried and sprayed with a developing spray of 3% p-anisidine hydrochloride in butanol, then dried by heating for 3 to 10 minutes. Sugars appear as brown spots on a yellow background; these may be identified by their Rf values, an Rf of 0.18 for glucose, and an Rf value of 0.37 for rhamnose.

A standard naringinase-containing enzyme preparation is one which effectuates at least 25% hydrolysis of the original 0.05% naringin solution at 50° in a pH range of 4.0 to 5.0 to yield at least 0.0008 gram of rhamnose and from 0 to 0.0009 gram of glucose under these standard conditions. The development of the hexose sugar rhamnose, with or without glucose, characterizes naringinase-containing enzyme preparations. Hence, naringinase may be considered as an enzymic principle which yields rhamnose with or without glucose from naringin.

Concentration of naringin or naringin and prunin at any given time is determined in accordance with the Davis test (W. B. Davis, Anal. Chem. 19, 476 (1947)).

In accordance with the Davis test, there is prepared the following: an alkaline diethylene glycol solution from: 950 ml. of diethylene glycol, 13.3 ml. of 6 N-sodium hydroxide, and 36.7 ml. water. To 10 ml. of this solution there are added 0.2 ml. of an enzyme-substrate solution to be tested. A yellow color develops. At the end of 20 minutes, the intensity of the color is determined spectrophotometrically. Absolute intensity of the yellow color is proportional to the naringin or naringin plus prunin content. By comparison with a standard curve showing the intensity of color given by known concentrations of naringin, the naringin plus prunin concentration of an unknown can be determined. The amount of prunin formed by a naringinase-containing enzyme preparation at any given time in a particular sample is the difference between the amount of naringenin formed by an enzyme preparation containing naringinase and the total amount of naringenin formed as the result of subsequently treating the sample with an excess of the enzyme emulsion at 35° C. and a pH of 5.0 until complete hydrolysis of prunin occurs. Essentially, percent naringin converted to prunin at any given time is equal to $$\begin{pmatrix} \text{Percent naringin to} \\ \text{naringenin after} \\ \text{emulsin treatment} \end{pmatrix} - \begin{pmatrix} \text{Percent naringin to} \\ \text{naringenin before} \\ \text{emulsin treatment} \end{pmatrix}$$

Emulsin is a plant extracted preparation having β-glucosidase enzymic activity which does not affect naringin. The enzyme is used preferably in crystalline form. Emulsin preparations are available commercially.

The determination of prunin proceeds as follows: After heating the sample to inactivate enzyme, if any is present, naringin plus prunin concentration in a particular sample is determined by the Davis test. Then the sample is treated with emulsin to hydrolyze all the prunin to naringenin. This hydrolysis is best performed with an excess of emulsin, such as an amount of 0.2 to 0.8% thereof, preferably crystalline emulsin, under conditions favoring hydrolysis by emulsin, such as a pH of about 4.5 to 5.0 and a temperature of about 30° to 35° C. When hydrolysis of prunin is complete, naringin content is again determined by the Davis test. The increase in naringenin or the further apparent decrease in naringin corresponds to the amount of prunin present before emulsin treatment. When the sample is a juice treated with naringinase, the further decrease in naringin corresponds to the amount of prunin present after naringinase treatment. As discussed above, in accordance with our invention, it is essential that enzymic splitting of naringin be arrested not later than the time at which the residual prunin is at least the equivalent of 15% of the original naringin, generally in the range of 40% to 85%, based on the original naringin content.

Naringinase activity on naringin may be arrested at the specified time by a number of methods. For instance, the treated juice may be heated at a temperature above 80° C. for a short period of time, such as for two minutes at 90° C. for one minute. Alternatively, the juice may be flash-pasteurized, treated by ultrasonic vibrations or by ultraviolet light. Another method which may be quite advantageous under certain circumstances is to freeze the treated juice in accordance with quick-freezing methods. Under circumstances where the juice is further treated with clarifying agents, such as clarifying enzymes, the naringinase-containing preparations may be separated from the treated juice in conjunction with the clarifying enzymes or inactivated in conjunction therewith. To arrest naringinase activity, the pH may be raised above 9.0 or decreased below 2.5 with chemical agents, such as strong mineral or organic acids, as sulfuric, hydrochloric acids, hydrobenzoic acid, oxalic acid, phthalic acid, or bases, such as hydroxides of alkali metals or of alkaline earth metals, as sodium hydroxide. We have also discovered that enzymic action may be substantially arrested by adding to the treated juice excess sugar, preferably glucose, such as to provide a final concentration of at least 2%, preferably at least 5% in the juice. This unusual aspect of our invention is particularly useful in that it permits treating a bitter juice containing naringin and subsequently, at the specified time when prunin remains in the juice in an amount equivalent to at least 15% of the original naringin, adding sugar in excess to prepare a sweetened, yet debittered, juice therefrom.

The earliest time at which naringinase action should be stopped is when there has occurred about 15% of conversion of naringin to prunin. Generally, the level of naringin reaches very satisfactory limits when there has occurred naringin conversion to prunin in an amount of 40% to 60%. Under particularly favorable conditions and with certain enzymic naringinase-containing preparations, conversion of naringin to prunin may rapidly reach essentially about 100%.

In all cases, conversion of naringin to naringenin is arrested when residual prunin is equivalent to at least 15%, generally 50% to 85%, and more especially 85% to 100%, of original naringin.

The preferred products of our invention are characterized by a combination of unusual properties. The enzyme treated juice contains a residual amount of naringin of not more than 40% of the original naringin content.

Products having essentially no residual naringin content are particularly outstanding in flavor and bouquet when hydrolyzed in accordance with this invention. However, low residual naringin is only one factor contributing to the unusual quality of our juices. Concurrently therewith, the naringenin content of the preferred juice products should be low, as it is when prunin is preserved, preferably in an amount equivalent to 40% to 85% of the original naringin. When there is essentially no naringenin, a particularly desirable juice is obtained. As a result of low naringin and low naringenin concentrations, prunin content is, therefore, appreciable and ranges from 40% to 85%, and even up to 100%. This factor appears to contribute significantly to the quality of our preferred products. Accordingly, these may be further identified as always containing at least 40% of the original naringin as prunin and the ratio of prunin content to any naringin content present being from at least 40:60 to all prunin and no naringin. Our preferred products are further identified by the ratio of prunin content to naringenin content, which is at least 40:60 and even more preferably in the range of 60:40, based on the original naringin. In exceptional cases, it is all prunin, no naringenin being formed. There is a unique situation where there is formed not only no naringenin but where there also is no residual naringin, the product containing essentially all prunin. Hence, the preferred products of our invention are identified, quite unlike natural products, by the presence of prunin, generally in high amounts, low amounts of naringenin, if any, and also low amounts of naringin, if any. The further unusual qualities which characterize the preferred products of our invention are their freedom of objectionable bitter taste, unimpaired color, a fruit flavor no longer masked by the bitter naringin principle. The desired pectinic cloud remains essentially unaffected.

Another very valuable aspect of our invention is an enzymic method for preparing prunin. As discussed above, prunin is the flavonoid glucoside of naringenin. Prunin is also a compound which belongs to a class of flavonoids, such as hesperedin and rutin, which are quite useful due to their vitamin-like action in increasing the resistance of blood capillaries to rupture. Whereas naringin and other similar flavonoid rhamno-glucosides are quite readily available in nature, the corresponding glucoside has been relatively difficult of obtain either as naturally-occurring or from the above-mentioned rhamnosido-glucoside. Previously attempts to remove the rhamnose portion of a biose attached to a flavonoid resulted in the removal of the entire biose. Also, it has been reported that hydrolysis procedures employing acids, such as sulfuric, acetic, phosphoric and citric, were tried without success. Recently, an attempt has been proposed in which there is used a cycloaliphatic alcohol and formic acid. This procedure is relatively slow, requiring 10 to 30 hours for adequate results.

We have now discovered an enzymic method for preparing prunin from naringin. In accordance with our method, a naringinase-containing enzyme preparation of the type discussed above is allowed to act on naringin in solution in the presence of an excess of a compound, generally a sugar, especially glucose, or other sugar, such as mannose, or another compound, such as gluconic acid, tannic acid, cyclohexyl-$\beta$-d-glucoside and gluconolactone, or mixtures of two or more of these compounds, which may be employed with substantially an equivalent effect. Calculated on a weight basis, glucose should preferably be present in an amount in the range of 40 to 200 parts for each part of naringin; and gluconolactone should be present in an amount ranging from 1.0 to 5 parts for each part of naringin. The other compounds should be present in intermediate amounts ranging from 1.0 to 1000 parts for each part of naringin. The naringinase preparation is used in the amounts discussed above; the original naringin concentration is not particularly critical. Naringin may be present all in solution or only in part as when naringin occurs in crystals due to saturation of the solution. As hydrolysis is carried out, more naringin is gradually dissolved. Excellent conversions, generally over 90% to prunin, are rapidly obtained. Prunin crystallizes out upon concentration of the aqueous medium. It is purified by recrystallization.

Our invention is further illustrated but not limited by the following examples, in which parts are by weight and percentage values are weight per volume. In the examples, the percentage values given refer to the amount of the original naringin converted to prunin and/or naringenin. In all cases, to obtain actual concentrations, naringen values may be multiplied by a factor of 0.47 and similarly prunin values may be multiplied by a factor of 0.75.

In the following examples, treatment is performed on one liter samples:

EXAMPLE A

*Production of a typical naringinase-containing preparation*

An enzyme preparation containing naringinase is obtained by preparing a growth medium from the following ingredients in the specified proportions:

| | Grams |
|---|---|
| Wheat bran | 5 |
| Soya bean meal | 3 |
| Steffen's waste | 0.5 |
| Ammonium phosphate | 2.5 |
| Naringin | 0.25 |

Water is added to make up to 190 ml. This medium is adjusted to a pH of 6 with 0.2 to 0.5 ml. of ammonium hydroxide and sterilized in a wide-mouth Erlenmeyer flask. The cooled, sterile medium is aseptically inoculated with spores of a strain of *Aspergillus niger*. The cotton-plugged inoculated flasks are shaken for 48 hours at 28° C. on a Gump shaker. Ten mls. of this culture are aseptically transferred to previously sterilized flasks containing 140 ml. of the above growth medium. After 96 hours on the Gump shaker at 28° C., the culture is filtered and a filtrate aliquot is tested for the desired enzymic activity.

One ml. of enzyme filtrate is tested in accordance with the p-nitrophenyl-$\beta$-d-glucoside screening test. From it, it is determined that the enzyme filtrate yields at least $0.5 \times 10^{-3}$ moles of p-nitrophenol from a $1.67 \times 10^{-3}$ molar solution in 20 minutes at 28° C. at a pH of 5. To this enzyme filtrate there are added four volumes of isopropanol. The precipitate is formed which soon settles. The supernatant liquor is taken off by decantation and the precipitate is suspended in three volumes of cold alcohol. The precipitate is then separated by centrifugation and dried in a thin layer of about 35° C.

A sample of this enzyme preparation is tested on a 0.05% naringin solution prepared from crystalline naringin, and citric acid and having a pH of 4. 0.2 ml. of a 2.5% solution of enzyme is mixed with a 25 ml. substrate aliquot. After incubation at 50° C. for two hours, portions of the substrate are tested chromatographically for the presence of rhamnose and/or glucose. There is found that 0.0008 gram of rhamnose and 0.0009 gram of glucose are liberated.

EXAMPLE 1

Fresh grapefruit juice extracted from culls of Texas grapefruit, having a distinctly strong bitter taste, is analyzed for total flavonoid concentration by the Davis method.

In a general manner, a large excess of enzyme is added to completely hydrolyze naringin, leaving other flavonoids. The decrease in color intensity after enzymic hydrolysis is proportional to original naringin content. The actual value is then determined from a standard curve. The method is carried out as follows: There are mixed:

0.2 ml. of juice
10 ml. of alkaline diethylene glycol prepared from 950 ml. of diethylene, 13.3 ml. of 6 N NaOH and 36.7 ml. of water A yellow color gradually develops. After 20 minutes, the intensity of the yellow color is determined in a Coleman Jr. spectrophotometer in calibrated test tubes. Naringin content is determined from a "standard curve" prepared from known concentrations over the necessary range. Original naringin content is found to be 0.7%.

To the juice there are admixed 2.5 grams of naringinase-containing enzyme preparation. The pH of the juice is 3.5. The juice is maintained at 28° C. with intermittent agitation. Periodically naringin and prunin concentrations are determined and the increase in naringenin concentration is calculated. When naringin concentration is reduced to 0.038%, the juice is heated for 15' at 100° C. The naringin converted to prunin is found to be .026%. The increase in naringenin concentration is found to be .006%. The resulting debittered grapefruit juice is now fit for human consumption. It has a delicate flavor emphasized by the pleasant freedom of excessive bitter taste.

The same procedure is followed while maintaining the juice at 35° C. Hydrolysis is even more rapid. When 25 grams of enzyme preparation are employed at 25° C., a very efficient hydrolysis occurs.

EXAMPLE 2

By the same procedure, grapefruit cull juice containing 0.076% naringin is treated with 0.5 gram of the above enzyme preparation till the original naringin is decreased to 0.04%; prunin concentration is .030% and naringenin content is increased by .006%.

Another sample of this juice is treated under refrigeration at a temperature of about 10° C. A well-controlled gradual splitting of naringin occurs. The juice is flash-pasteurized when naringin content is reduced to 0.03%. The prunin content is .037% and the increase in naringenin concentration is 0.009%, based on original naringin concentration.

Another sample is treated at 5° C. After a somewhat longer period of hydrolysis, a product of decreased bitterness is obtained.

EXAMPLE 3

Canned grapefruit juice, unsweetened, and obtained from Texas Pinkmeat grapefruit, having a naringin content of 0.058%, is heated to about 50° C. and a naringinase preparation is admixed to give an enzyme concentration of 0.15%. The temperature is maintained at 50° C. for one hour. At that time, naringin analysis shows a reduction of 90% to a naringin content of 0.006%, a prunin content of 0.047%, and an increased naringenin content of 0.005%, based on original naringin concentration. The juice is heated to over 120° C. for one minute. The sample obtained is free of objectionable bitter taste and has a delicate, pleasant, and sweet flavor. The juice may be consumed alone; it is well-suited for mixing in large amounts with other fruit juices, such as orange, lemon, pineapple, and apricot juices.

Following a similar procedure, the juice is treated at 60° C. to yield a product free of objectionable bitterness.

EXAMPLE 4

A sample of sweetened, canned grapefruit juice, having a naringenin content of 0.058%, is treated at 35° C. for two hours with 0.20% of enzyme preparation, at the end of which time naringin content is reduced by more than 95% to 0.003%. The prunin content is 0.053% and naringenin content, based on original naringin, is increased by 0.002%. Enzyme action is stopped by freezing the juice. A sweet juice free of objectionable bitter taste is obtained.

EXAMPLE 5

Indian River grapefruit is extracted and the major portion of the free-run juice is placed aside for further treatment. The grapefruit culls and peels are further expressed under high pressure, the juice obtained containing naringin in the amount of 0.118%. It has a very objectionable bitter taste which renders it unfit for human consumption. To this juice, there is mixed 0.5% of naringinase-containing preparation while the temperature is maintained at 45° C. After one hour of treatment, analysis of naringin content disclosed a reduction thereof to 0.014%. The prunin content is .094, and naringenin increased to 0.010%, based on original naringin concentration. The juice is now free of the major portion of its original objectionable bitter taste. No loss in turbidity and cloudiness of the juice is observed. Enzymic action is arrested by pasteurizing. The juice product is now useful for mixing with straight run juice or for concentration to citrus molasses.

The free-run juice from above, containing an initial naringin content of 0.07%, is treated with 1% of naringinase preparation. In one-half hour at 25° C., essentially no naringin remains. The prunin content is 0.056%. The debittered juice is concentrated three-folds in vacuo, canned and frozen.

EXAMPLE 6

Grapefruit juice obtained from early-season grapefruit and having a Brix acid ratio of 6 to 1 and an initial naringin content of 0.09% is treated with 0.1% of a naringinase-containing enzymic preparation at 25° C. After two hours of treatment, naringin content is reduced to 0.03% and the prunin content is 0.03% while naringenin is increased to 0.006%. This early-season juice is free of objectionable bitter taste; it has a refreshing tang. It is well-suited for juices of low sugar content, or for mixing with other juices.

In a similar manner, there is treated a mixture of 50 parts of early-season tangerine juice and 50 parts of early-season grapefruit juice. The resulting mixture is free of objectionable bitter taste. The delicate flavors of the juice are fully preserved.

EXAMPLE 7

In a five-gallon kettle, fresh grapefruit juice containing 0.12% of naringin is treated with sulphur dioxide to sterilize the juice. The juice is then inoculated with cells of a yeast, *Saccharomyces ellipsoideus*. While maintaining the temperature at 30° C., a vigorous fermentation is carried out. When the fermentation is terminated, the yeast is separated and the grapefruit wine is then treated with a 1% naringinase preparation at 50° C. At the end of the treatment, a wine product is obtained having a substantially improved taste and decreased naringin content. In another experiment, the grapefruit juice is treated with naringinase before fermentation with a yeast.

In a similar manner, grapefruit juice, after or before treatment with naringinase, is treated with an appropriate species of Acetobacter in order to prepare a grapefruit vinegar. The product has decreased bitterness.

EXAMPLE 8

Grapefruit juice extracted from Florida winter grapefruit having a Brix acid ratio of 6.5 to 1 and a naringin content of 0.12% is treated with 0.5% of naringinase at 50° C. After two hours, the naringin content is decreased by 80%, giving a naringin content of 0.024% and a prunin content of 0.081%; naringenin increased to a content of 0.015%. Excess glucose is then added to give a total concentration of 5%. The debittered sweetened juice is concentrated and frozen for further use.

EXAMPLE 9

Two grams of recrystallized naringin are dissolved in approximately 800 ml. of hot water. To this solution there are added 10 grams of gluconolactone and 6 grams of citric acid. The pH is adjusted to 4 with sodium hydroxide. The volume is made up to a liter. Five grams of naringinase enzyme preparation are added and the temperature is maintained at 50° C. for two hours. Analysis shows essentially complete conversion of naringin to prunin. The solution is concentrated under vacuum and crude prunin precipitates out. The product is recrystallized several times from a methanol-water solution.

EXAMPLE 10

Five grams of naringin are added to 450 ml. of hot water at 50° C. Part of the naringin remains undissolved. There are added 120 grams of glucose and 3 grams of citric acid. The pH is adjusted to 3.5. Three grams of naringinase enzyme preparation are mixed with the solution. At the end of six hours, during which the remaining naringin is dissolved by intermittent mixing, essentially all the naringin is converted to prunin. Prunin is recovered by crystallization.

In a similar manner, prunin is prepared by carrying out the above procedure at about 15° C. The preparation takes somewhat longer.

In Example 10, 20 grams of the 120 grams total glucose are substituted by 2 grams of gluconolactone and the hydrolysis is carried out following the same procedure. Equally satisfactory results are obtained.

We claim:

1. A method for improving the taste, including decreasing the bitterness by decreasing the naringin content of naringin-containing juices, which comprises treating said juices with an added enzyme preparation containing naringinase and discontinuing the action of said naringinase when at least 15% of naringin is converted to prunin and before complete conversion to naringenin when there remains an amount of prunin which is equivalent to at least 15% of original naringin in the treated juice.

2. The method of claim 1 in which treatment is effectuated within a pH range of 2.5 to about 9 and within a temperature range of 5° to 60° C.

3. The process of claim 1 in which the naringin-containing juice contains grapefruit juice.

4. The process of claim 3 in which the naringin-containing juice is expressed from grapefruit.

5. A method for improving the taste including decreasing the bitterness of naringin-containing juices by decreasing their naringin content which comprises treating said juice by admixing and by at least partially dissolving therein an enzyme preparation containing naringinase, maintaining said solution within a temperature range of about 5° to 60° C. and at a pH range of about 2.5 to 5.5 to convert concurrently for at least part of the time naringin to prunin and prunin to naringenin, respectively, and discontinuing enzymic action on naringin when naringin has been enzymically coverted in amounts of about 15% to about 100% and before complete conversion to naringenin while there still remains an amount of prunin which is equivalent to at least 15% of original naringin in the treated juice.

6. The process of claim 5 in which enzymic action is discontinued by inactivating naringinase.

7. The process of claim 5 in which complete conversion to naringenin is substantially inhibited by adding excess glucose to the treated juice.

8. The process of claim 6 in which enzymic action is discontinued by heating.

9. The process of claim 6 in which enzymic action is discontinued by inactivating by freezing.

10. A method for improving the taste including decreasing the bitterness of naringin-containing juices by decreasing their naringin content which comprises treating said juice by admixing and by at least partially dissolving therein an enzyme preparation containing naringinase, maintaining said solution within a temperature range of about 5° to 50° C. and at a pH range of about 2.5 to 4.5 to convert concurrently for at least part of the time naringin to prunin and prunin to naringenin, respectively, and discontinuing enzymic action when naringin has been enzymically converted in an amount of 15% to about 100% and before complete conversion to naringenin when there remains an amount of prunin which is equivalent to a range of 15% to about 100% of original naringin in the treated juice.

11. The process of claim 10 in which enzymic action is arrested when at least 15% to essentially all of the original naringin has been converted to essentially only prunin.

12. A juice of decreased naringin content, free of objectionable bitterness and improved taste which contains prunin and which is further identified by having a ratio of prunin to naringin content in the range from 60:40 to essentially all prunin and no naringin and further by a ratio of prunin content to naringenin content in the range from 40:60 to essentially all prunin and no naringenin.

13. The product of claim 12 in which the juice is expressed at least in part from grapefruit.

14. The product of claim 12 in which the juice is expressed at least in part from early-season fruit having a Brix acid ratio from 6:1 to 12:1.

15. A naringinase-treated juice of decreased naringin content, free of objectionable bitter taste and of improved flavor, said juice being essentially free of naringin and of naringenin and containing essentially only prunin in an amount equivalent to the original naringin.

16. An enzymic method for preparing prunin which comprises treating a solution containing naringin with an enzymic preparation containing naringinase in the presence of at least one compound selected from the group consisting of glucose in an amount in the range of 40 to 200 parts by weight for each part of naringin and gluconolactone in an amount in the range of 1 to 5 parts by weight for each part of naringin, said treatment being carried out within a pH range of 3 to 7 and at a temperature of about 5° to about 60° C., allowing naringinase to act on naringin until substantial conversion thereof to prunin and recovering prunin.

References Cited in the file of this patent

UNITED STATES PATENTS

| | | |
|---|---|---|
| 1,932,833 | Willaman et al. | Oct. 31, 1933 |
| 2,563,855 | McColloch et al. | Aug. 14, 1951 |